Jan. 16, 1940.   C. E. OLMSTED ET AL   2,187,430
RUBBER GLOVE
Filed Feb. 23, 1938
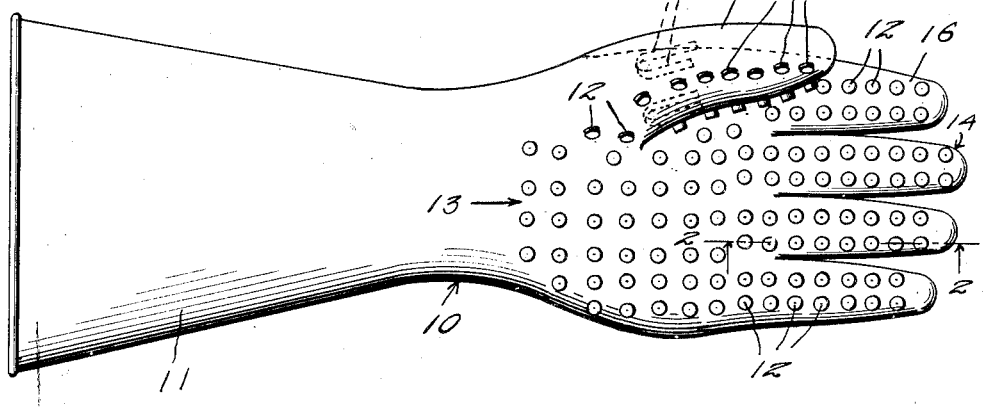
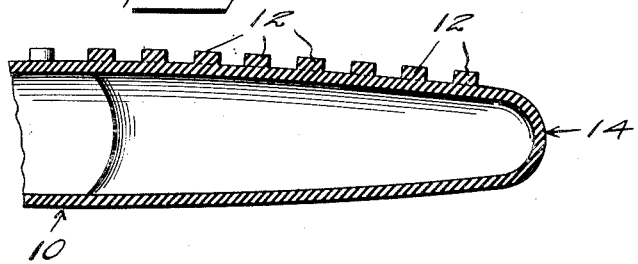
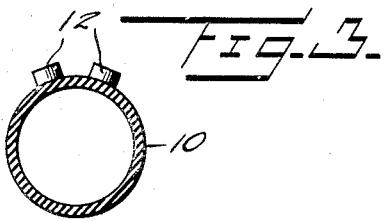
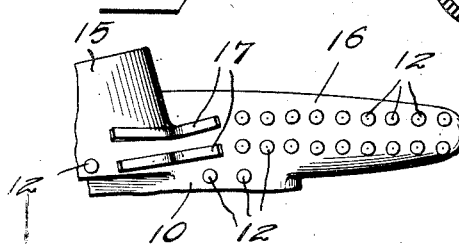
Clifton E. Olmsted
Harold McClary
INVENTORS
BY Victor J. Evans & Co.
ATTORNEYS Patented Jan. 16, 1940

2,187,430

UNITED STATES PATENT OFFICE 2,187,430

RUBBER GLOVE

Clifton E. Olmsted and Harold McClary, Tacoma, Wash.

Application February 23, 1938, Serial No. 192,099

2 Claims. (Cl. 2—168)

This invention relates to gloves for handling glued and similarly coated articles or sheets of material to prevent undue wiping and obliteration of the coating.

In the handling of the glued sheets or slabs of material, particularly in the production of laminated articles, boards or sheets in the plywood and veneering industry, and the like, either with the bare or gloved hand, wiping and obliteration of the adhesive occurs and bare surface spots of considerable area result, so that when the pressure is applied to the assembled layers or laminations the glue surrounding the bare spots will not flow sufficiently to cover such spots. Hence, the adherence between the laminations is defective and, therefore, a poor bond results and shows up in the form of blisters, loose faces and other defects in the finished product.

The principal object of the present invention is to provide a practical glove structure whereby the glued materials may be handled without undue obliteration of the adhesive from the surface of the material.

Another object is to arrange a multiplicity of characteristic protuberances upon the inner finger, palm and heel portions of the glove in relatively close relation to each other and having slight surface area individually, whereby the article or sheet handled may be firmly grasped and yet leave no separate bare spots of any considerable area, and whereby, also, no bare lines or strips of any considerable width are caused when the glove is moved across the surface.

Another object is to provide for the economical production of the glove from rubber or any synthetic material of similar character.

With the foregoing and other objects to be attained, as will hereinafter more fully appear, the invention consists in the novel construction and formation as described in the following specification and pointed out in the appended claims, reference being had to the accompanying drawing illustrating a practical embodiment of the invention, and in which Figure 1 is an inner face view of the glove;

Figure 2 is a fragmentary section through one finger portion of the glove, on the line 2—2 of Figure 1;

Figure 3 is a cross section through one of the finger portions; and

Figure 4 is a fragmentary face view showing a practical reinforcement between the thumb and forefinger portions of the glove.

Referring now to the drawing the numeral 10 designates the glove, generally, which is preferably made of rubber or like characteristic material. As shown, the glove is of the slip-on type having the usual elongated and flared wrist and forearm portion 11 but, obviously, may be of any other approved or desired type.

On the inner finger, palm and heel portions of the glove are a multiplicity of protuberances 12 which are of slight end surface area individually and may be of any desired form. As shown, said protuberances are in the form of flat-faced cylindrical bosses or buttons but, obviously, they may be rounded at their ends or tapered, and either sharp-pointed or truncated, the object being to provide grouped protuberances in cooperatively spaced relation to each other so as to provide a multiplicity of minute contact faces instead of a single surface of considerable area and at the same time not detract from the requisite flexibility and handling qualities of the glove.

Preferably, the protuberances are arranged in parallel longitudinal rows extending continuously from the heel portion 13 of the glove to the finger tips 14 thereof and in rows also transversely of the glove, the respective protuberances being relatively close to each other in their spaced relation as compared to their elevation from the surface of the glove so that, when the glued article or sheet is grasped by the gloved hand, the portions of the glove between said protuberances do not come in contact with the glued surface, that is to say, only the ends of the respective protuberances engage the surface and displace or obliterate the adhesive in a multiplicity of spots of very slight area each and the respective spots being so close to each other that the remaining adhesive on the surface spreads and covers said spots when two layers or laminations of veneering or a plywood board or the like are pressed together. So, too, should the glove be moved across the surface of the glued article or sheet being handled the protuberances 12 will only bare the surface in very narrow lines which are relatively close together and the displaced adhesive is merely divided and raised in ridges at opposite sides of each line and, obviously, the laminations or layers of the plywood or veneer, and the like, may be pressed together without any bare places between them, because there is sufficient adhesive to spread and cover the narrow bared lines. In other words, what is known as "glue wiping" which frequently results in the handling of glued materials either with the bare hand or a plain gloved hand is prevented in a practical manner and a further advantage is attained in that the work can be appreciably hastened by the use of the glove in accordance with the present invention, as well as the avoidance of defects in the product which usually occur due to the herein described glue wiping effect in handling the material.

In addition to the provision of the protuberances 12, the glove is preferably reinforced in the region of the juncture of the base of the thumb portion 15 and forefinger portion 16 where the greatest strain occurs in the use of the glove. This is accomplished in a practical way by providing a plurality of elongated narrow protuberances or ribs 17 as shown more clearly in Figure 4, said protuberances 17 being spaced laterally from each other in the same relatively close relation as that of the respective rows of the protuberances 12, by which provision and arrangement of said elongated protuberances 17 a practical non-wiping effect is attained as well as the reinforcing of the glove structure in that region.

Obviously, the glove may be modified in many respects as to its type and also as to the form and arrangement of the respective protuberances and reinforcement without departing from the spirit and scope of the invention as defined by the appended claims. The invention, therefore, is not limited to the specific construction and arrangements shown in the accompanying drawing.

What is claimed is:

1. A glove for handling articles having glued or like coated surfaces, said glove having a multiplicity of substantial bodied, generally cylindrical, flat ended, separately formed and individually form retentive protuberances on its inner finger, palm and heel portions arranged in relatively close relation to each other and each protuberance having a relatively slight contacting end surface, and a reinforcement in the immediate crotch region between the thumb and forefinger portions of the glove, said reinforcement comprising elongated longitudinal rib-like protuberances.

2. A glove for handling, without appreciable or deleterious wiping effect, articles having wet glued or like coated surfaces, said glove having a multiplicity of substantial bodied, separately formed and individually form retentive protuberances each of substantial elevation and having slight contacting end surface, on its inner finger, palm and heel portions, said protuberances being arranged in relatively close relation to each other in spaced longitudinal and transverse rows and supporting the intervening portions of the glove from contact with the surface of the handled article.

CLIFTON E. OLMSTED.
HAROLD McCLARY.